United States Patent [19]
Jirousek

[11] 3,815,458
[45] June 11, 1974

[54] MACHINE FOR CUTTING NON-RIGID MATERIALS

[75] Inventor: Arthur E. Jirousek, Bloomington, Minn.

[73] Assignee: Anderson Machine and Tool Works, Inc., Chaska, Minn.

[22] Filed: May 1, 1972

[21] Appl. No.: 248,961

[52] U.S. Cl............................ 83/83, 83/86, 83/98, 83/255, 83/402, 83/408, 83/436, 83/461, 83/477.2, 83/488, 83/490, 83/925 CC
[51] Int. Cl........ B26d 5/04, B26d 5/12, B26d 7/02
[58] Field of Search ....... 83/490, 471.2, 461, 477.2, 83/481, 402, 477.1, 477, 86, 488, 83, 98, 255, 436, 925 CC

[56] References Cited
UNITED STATES PATENTS

| | | | |
|---|---|---|---|
| 555,962 | 3/1896 | Meister | 83/490 X |
| 1,793,208 | 2/1931 | Biggert, Jr. | 83/490 |
| 1,812,406 | 6/1931 | Jenkins | 83/488 X |
| 2,692,645 | 10/1954 | Driesch | 83/490 X |
| 3,076,366 | 2/1963 | Grandstedt | 83/402 X |
| 3,143,016 | 8/1964 | Obenshain | 83/402 X |
| 3,273,775 | 9/1966 | Cook | 83/402 X |
| 3,456,855 | 7/1969 | Mutter | 83/490 X |
| 3,657,952 | 4/1972 | Brockbank et al. | 83/488 X |

Primary Examiner—Frank T. Yost

[57] ABSTRACT

This invention is addressed to a machine for cutting non-rigid materials advanced over a cutting surface for being cut into the desired pattern. The machine includes a radius cutter formed of a spindle rotatably mounted above the cutting surface and having an arm extending outwardly therefrom carrying a rotary knife. The radius cutting assembly also includes means for fixing the rotatable knives and means for rotating the spindle to advance the rotary knife through an arcuate path of the cutting surface. The apparatus can also be provided with slitting knives which are adapted to be raised and lowered from and toward cutting relationship with the non-rigid material on the cutting surface to trim the non-rigid material into the desired length or otherwise form longitudinal slits in the non-rigid material.

22 Claims, 9 Drawing Figures

MACHINE FOR CUTTING NON-RIGID MATERIALS

This invention relates to a cutting machine, and more particularly to a cutting machine for cutting cloths, mattress panels, quilted material, sheets of elastomeric materials and like non-rigid materials.

Few machines for cutting limp or non-rigid materials are known to the art because such machines generally do not provide sufficient flexibility for cutting a variety of pattern configurations. One cutting machine which has achieved widespread acceptance in the art is the cutting machine described and claimed in U.S. Pat. No. 3,165,959, in which description is made of a cutting machine in which the material to be cut is advanced through the machine by two or more pairs of spaced drive rollers.

The device is provided with trimming knives positioned along the sides of the machine to trim the edges of the material to provide the desired width in the cut material. The material can be cut into the desired lengths by a knife which travels transversely to the direction in which the material to be cut is advanced through the machine. When it is desired to round the corners of the cut material, the device can be provided with a pair of notching dies for this purpose.

While the device described in the foregoing patent represents a significant advance in the art of cutting non-rigid materials of the type described above, there is still a need to provide a cutting machine having even greater flexibility in the pattern configurations which the machine is capable of cutting.

It is accordingly an object of the present invention to provide a machine for cutting limp or non-rigid materials which overcomes the foregoing disadvantages, and it is a related object of the invention to provide a cutting machine having greater flexibility in the configuration patterns of the cut material.

It is a more specific object of this invention to provide a machine for cutting non-rigid materials which is capable of curved cuts having large radii and which is capable of cutting such materials to predetermined lengths either before or after one or more large radii are cut.

These and other objects and advantages of the invention will appear more fully hereinafter and, for purposes of illustration, but not of limitation, an embodiment of the invention is shown in the accompanying drawings in which.

The cutting machine of the present invention is of the type described in U.S. Pat. No. 3,165,959 and includes one or more pairs of drive rollers which engage the material to advance the material over a cutting surface. The material can be cut to predetermined lengths by a transverse cutter which is adapted to travel over the cutting surface in a direction transverse to the direction in which the material is advanced, and the material can be trimmed along its edges by means of one or more trimming knives.

In accordance with the concepts of the present invention, the cutting machine is provided with at least one radius cutter assembly which is capable of cutting a radius of up to 180°. The radius cutter assembly for use in the machine of the invention preferably comprises a cantilever arm having a cutting knife mounted thereon, with the arm being fixed to a rotatable spindle whereby rotation of the spindle causes the arm with the knife mounted thereon to travel through an arcuate path to cut a radius equal to the length of the cantilever arm.

In the preferred embodiment, the cutter assembly includes means to disengage the knife from the cutting surface to stop or at least interrupt the cutting of the radius. For this purpose, the cantilever arm can include a hinged portion to permit the knife to be lifted from engagement with the material to be cut on the cutting surface.

Another feature of the present invention includes trimming knives which are likewise adapted to be removed from engagement with the material to be cut on the cutting surface whereby the trimming or slitting action of the trimming knives can be stopped or at least interrupted as the material to be cut is advanced over the cutting surface. In a preferred embodiment, the trimming knives are mounted for reciprocating vertical movement on a hydraulic or pneumatic cylinder to lower the trimming or slitting knives into cutting position and to raise the knives from cutting position.

Still another feature of the cutting machine of the invention includes a stacking assembly to fold and stack the non-rigid material as it is discharged from the cutting surface. The stacker assembly for use with the cutting machine of the invention includes a table mounted for reciprocation and positioned to receive the material as it is discharged from the cutting surface. By reciprocating movement, the stacking assembly table is capable of folding the material as it is discharged from the cutting surface.

Figure 4:
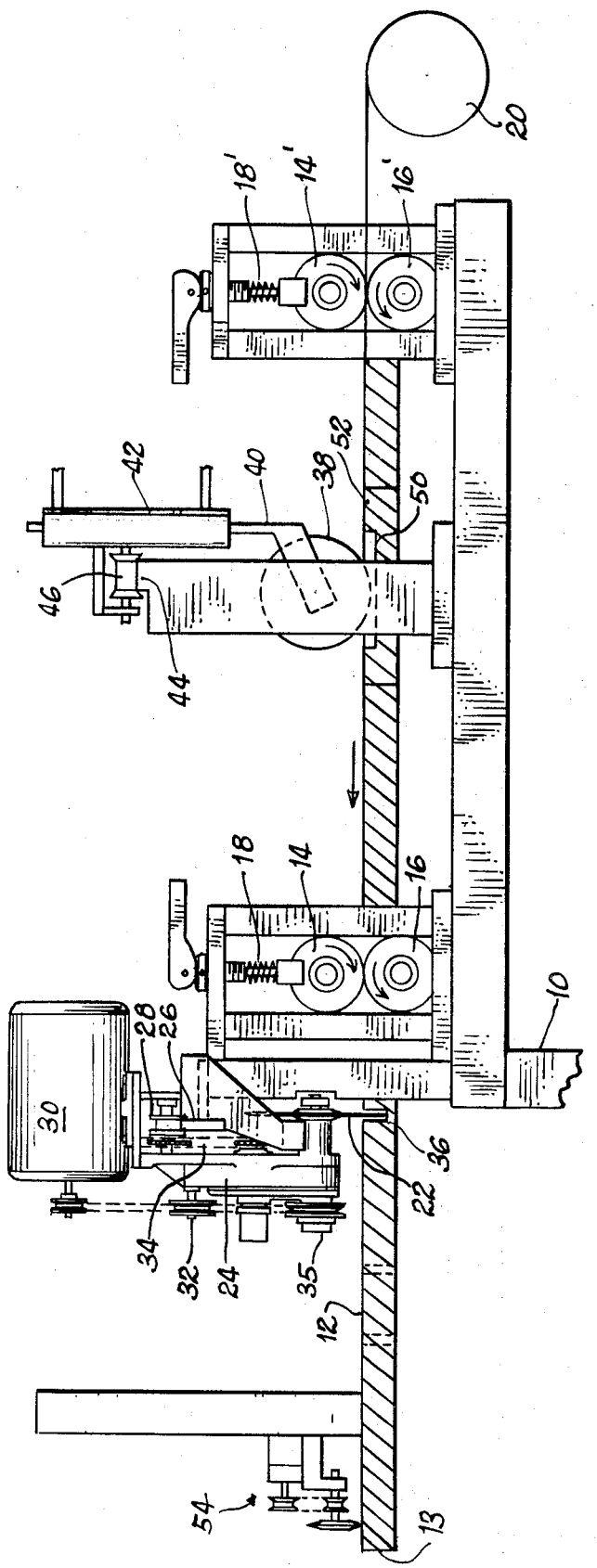
FIG. 4 is a side elevation view of a cutting machine embodying the features of this invention, illustrating the combination of a radius cutter assembly with the drive rollers and slitting knives.

Referring now to the drawings for a more detailed description of the invention, there is shown in FIG. 4 a cutting machine embodying the features of the invention. The device includes a suitable frame 10 on which there is mounted a cutting surface 12 over which the material to be cut is passed. The material is advanced through the cutting machine over the cutting surface 12 by one or more pairs of rollers 14 and 16 which engage the material therebetween. One of the rollers 14 is constantly urged toward contact with the other by way of spring or cylinder means 18 to insure pressure engagement of the material between the rollers.

Both rollers 14 and 16 are adapted to be driven by means not shown in the drawings for purposes of simplicity. Suitable drive means for driving the rollers are fully described in the foregoing patent. The material to be cut can be supplied from a bolt of material 20, either continuously or discontinuously, or from a quilting machine or the like, and advanced over the cutting surface by the drive rollers 14 and 16.

Adjacent to the cutting surface 12, there is mounted the transverse cutting knife 22 which is preferably in the form of a rotary knife of the type described in the above patent. The knife 22 is rotatably mounted on an arm or head 24 which is in turn carried on a rail 26 extending transversely across the cutting surface 12 by means of roller 28.

Motor 30 drives a shaft 32 which is connected to roller 28 by way of a drive belt or chain 34. Thus, as motor 30 is energized, it drives the roller 28 which advances the arm 24 transversely across the cutting surface on rail 28. As the motor 30 drives the arm or head 24 across the cutting surface, the motor 30 also serves to drive the rotary knife 22. As shown in FIG. 4, motor 30 simultaneously drives a shaft 34 on which rotary knife 22 is mounted.

In the preferred embodiment shown in FIG. 4, the cutting surface 12 is formed with a transversely extending slot 36 adapted to receive the rotary knife 22 through its travel across the cutting surface 12 to insure that the knife 22 cuts completely through the material to be cut on the cutting surface 12.

Positioned rearwardly of the transverse cutter 22 is one or more trimming or slitting knives 38 which are similarly in the form of rotary knives. As shown in FIG. 4, the slitting knives 38 are mounted on an arm 40 which is operatively connected to a hydraulic or pneumatic cylinder 42. Thus, the slitting knife 38 can be lowered to engage the material to be cut on the cutting surface 12 to slit or trim the material to be cut, and can be raised by activation of the cylinder 42 to disengage the knife 38 from the material on the cutting surface 12.

The cylinder 42 having the knife 38 mounted thereon for reciprocal movement in a substantially vertical direction can be positioned in any convenient manner. In a preferred embodiment, the cylinder 42 is mounted on a transversely extending rail 44 above the cutting surface. As shown in FIG. 4, the cylinder is mounted on a roller support 46 which is carried on the rail 44 to enable the width of the cut made by slitting knife 38 to be adjusted as desired. As will be appreciated by those skilled in the art, the roller support 46 can be driven by an electric motor or the like to permit the slitting knife 38 to be displaced along rail 44 automatically, if desired.

In the one embodiment, the slitting knife 38 is driven by, for example, an electric motor 48 or the like. The motor 48 can be fixed to the arm 40 whereby the motor is likewise raised with the knife 38 when it is desired to disengage the knife 38 from the cutting portion.

As in the case of transverse cutting knife 22, the slitting knives 38 are positioned above a slot 50 formed in the cutting surface 12 adapted to receive the knife 38 to insure that the slitting knife 38 cuts through the thickness of the material advanced over the cutting surface 12. In embodiments in which the portion of the slitting knives 38 are adjustable over the rail 44, it is desirable that the cutting surface be formed with a shoe portion 52 which is slidably mounted below the cylinder 42 so as to be laterally adjustable with the position of the slitting knife 38.

Also positioned above the cutting surface 12 is at least one radius cutter assembly, referred to generally in FIG. 4 as 54. As shown in this figure, one or more radius cutters can be positioned in advance of the transverse cutter 22 although, as one skilled in the art will appreciate, the position of the radius cutter or cutters above the cutting surface 12 can be varied considerably depending on the pattern configuration sought to be cut.

Figure 1:
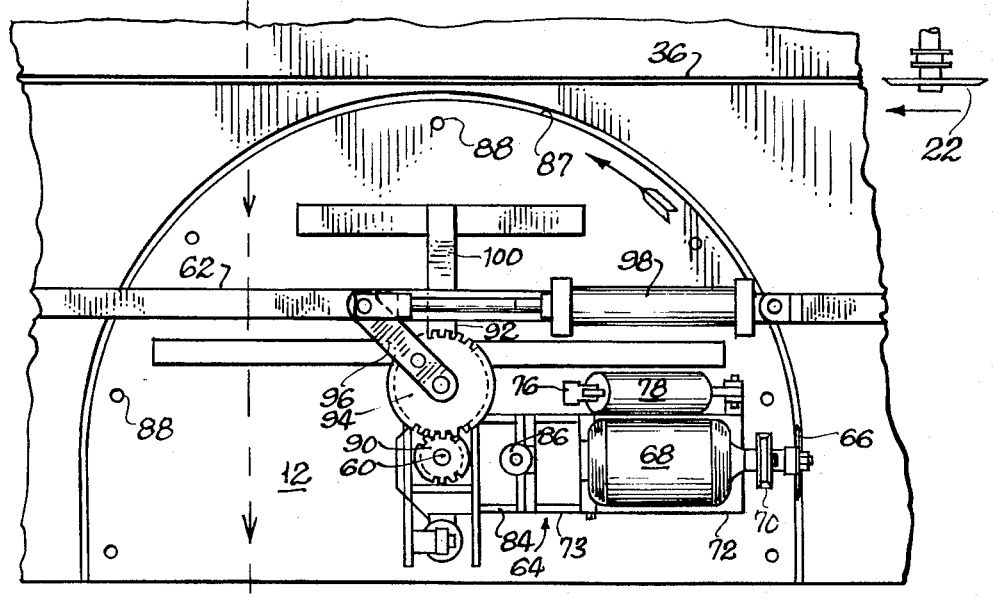
FIG. 1 is a plan view of a radius cutter assembly embodying the features of this invention.
Figure 2:
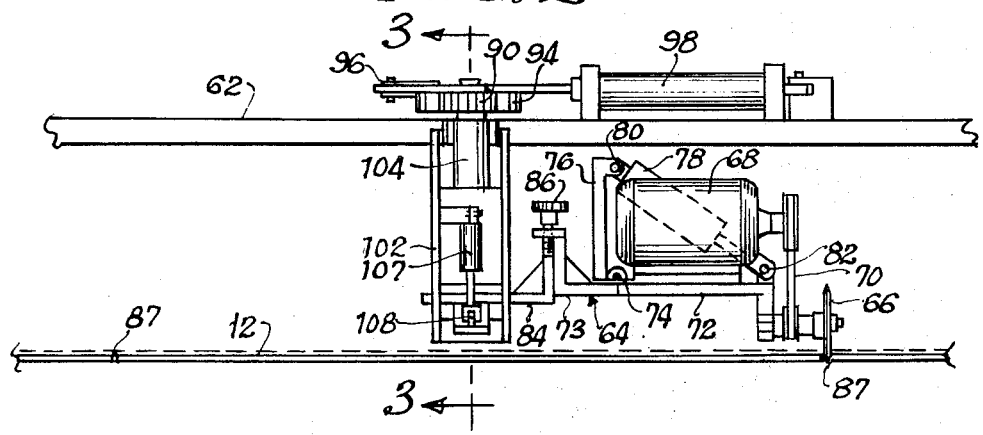
FIG. 2 is a side elevation view of the radius cutter assembly shown in FIG. 1.
Figure 3:
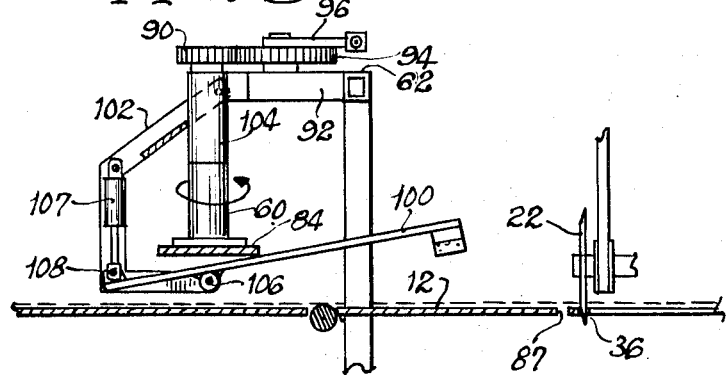
FIG. 3 is a sectional view taken along the lines 3—3 in FIG.

The details of the radius cutter assembly 54 are shown in somewhat greater detail in FIGS. 1 to 3 of the drawings. As shown in these figures, the radius cutter assembly includes a spindle 60 rotatably mounted above the cutting surface 12 on a transversely extending support bar 62. Fixed to the lower portion of the spindle 60 is an arm 64 which extends radially outwardly from the spindle 60 and carries a rotary knife 66 and means such as an electric motor 68 for driving knife 66 by a conventional belt or chain drive 70.

In a preferred embodiment, the arm 64 includes a hinged portion upon which the knife 66 and the motor 68 are mounted and which is mounted on an intermediate portion 73 of the arm 64 by means of a hinge 74 to raise the hinged portion 72 from the position shown in FIG. 2 of the drawing to thereby disengage the knife 66 from the cutting position illustrated in FIG. 2. It is frequently desirable to provide means to pivot the hinged portion 72 about the hinge 74 to raise the knife 66 from the cutting position. For this purpose, the intermediate portion 73 of the arm 64 is provided with a vertically extending support 76 which carries a pneumatic or hydraulic cylinder fixed to the upper portion of support 76 by hinge means 80 and to the hinged portion 72 of the arm 22 by hinge means 82. Thus, activation of the cylinder 78 serves to raise and lower the knife 66 by causing the hinged portion 72 to be pivoted about hinge 74.

The intermediate portion 73 of arm 64 is preferably provided with means to adjust the height of the hinged portion 72 above the cutting surface 12. The intermediate portion 73 can conveniently be fixed to a bracket 84 mounted on spindle 60 by an adjusting screw 86 which is adapted to vary the elevation of the intermediate portion 73 relative to bracket 84.

Because spindle 60 is rotatable, the arm 64 fixed thereto can be rotated up to 180° or greater if desired. As the arm is rotated with the spindle, the rotary knife cuts along a semi-circle, the radius of which is equal to the length of the arm 64. The cutting surface 12 is preferably provided with a continuous groove 86 corresponding to the path followed by the knife 66 on rotation of spindle 60 and adapted to receive the knife 66 to insure that the material to be cut is cut completely through its thickness. The cutting surface 12 is also provided with a series of openings 88 therethrough which are adapted to be connected to a source of compressed air or similar fluid for passage of air or the like onto the surface 12. The fluid passing upwardly through openings 88 not only serves to decrease friction as the material is passed over the surface, but also operates to remove threads and other scrap material from the cutting surface.

The spindle 60 can be rotated to displace the knife 66 about an arcuate path by a number of means. It is preferred to provide spindle 60 with a toothed gear wheel 90 which is fixed to spindle 60 and rotatable therewith. Mounted on cross bar 92, which in turn is fixed to support bar 62, is a gear wheel 94 which is positioned to mesh with the teeth of gear wheel 90 whereby rotation of gear wheel 94 causes gear wheel 90 and consequently spindle 60 to be rotated.

As is best illustrated in FIG. 1, gear wheel 94 is driven by a yoke 96 which is activated by a pneumatic or hydraulic cylinder 98 mounted on support bar 62. As the piston of cylinder 98 is advanced into the cylinder (to the right as shown in FIG. 1), the knife 66 is displaced on an arcuate path in a counter-clockwise direction; on the return stroke of the piston, the knife 66 is returned to its starting position as shown in FIG. 1.

It is frequently desirable to include with the radius cutter assembly means to maintain the material to be cut on the cutting surface and thereby insure a smoother cutting operation as the knife 66 is advanced over an arcuate path. Associated with the radius cutter is a clamp including a clamping arm 100 which is adapted to engage the material to be cut on the cutting surface 12 to secure the material thereto and prevent sliding of the material on the surface 12.

Clamping arm 100 is mounted on a frame 102 which is fixed to a fixed sleeve portion 104 of the spindle 60. Arm 100 is pivotally mounted on a fulcrum 106, with one end thereof pivotally fixed to a pneumatic or hydraulic cylinder 102 at 108. As the cylinder 102 is activated to displace the piston thereof upwardly to raise end 108 of the arm 100, the opposite end of the arm 100 is lowered for pressure engagement with the material on the cutting surface 12.

Figure 5:
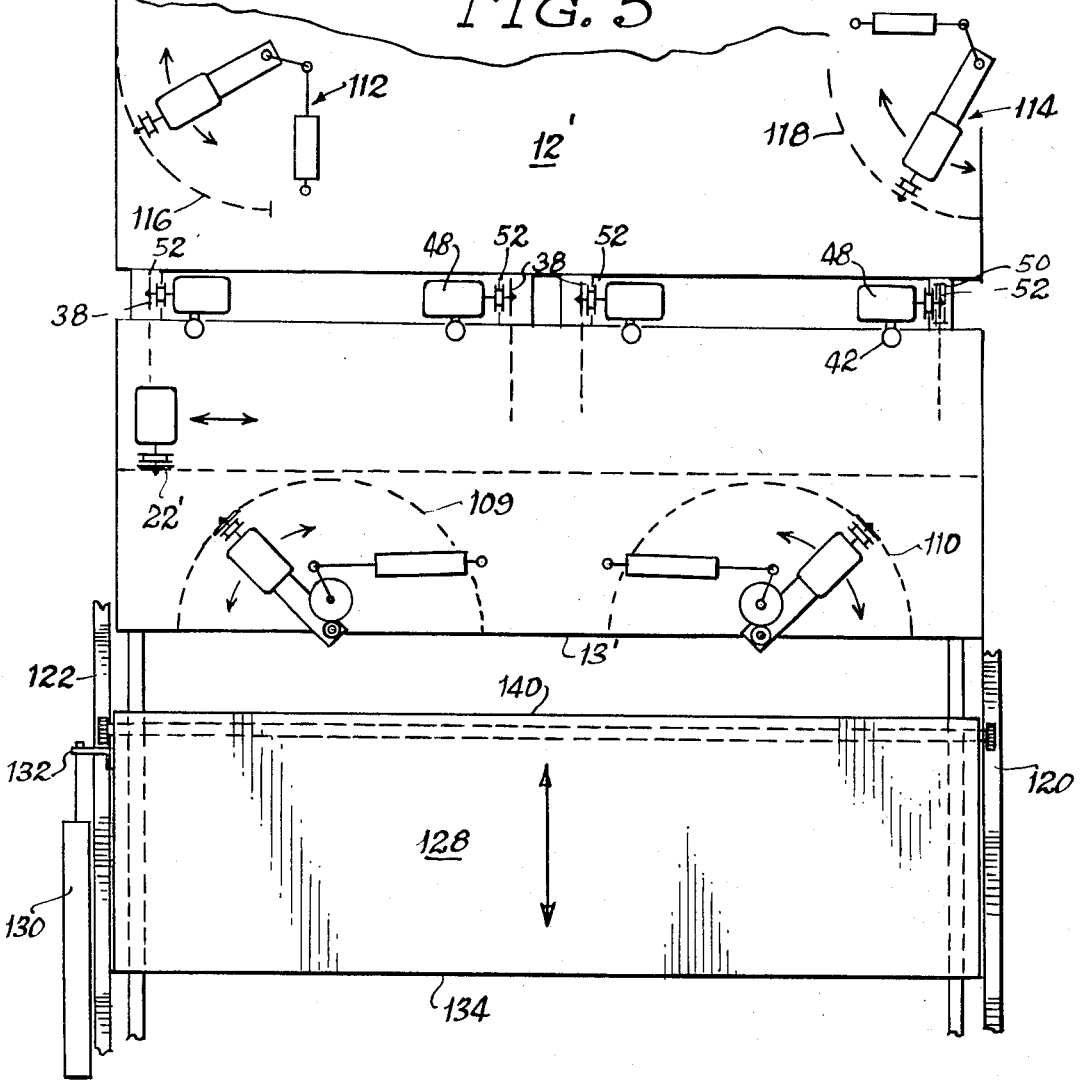
FIG. 5 is a plan view of one alternative arrangement of the elements including a plurality of radius cutting assemblies.

As will be appreciated by those skilled in the art, the relative positions of the radius cutting assembly or assemblies, the trimming knife and the transverse cutter can be varied, depending upon the configuration sought in the cut panel. One such variation is shown in FIG. 5 of the drawing in which there is shown a cutting surface 12' of the type previously described, having a transverse cutting knife 22' mounted thereon for cutting non-rigid material advanced over the cutting surface into the desired length. In the embodiment shown in FIG. 5, the cutting surface 12' is provided with a pair of radius cutting assemblies 104 and 106 positioned forward of the transverse cutter 22'. In this embodiment, the apparatus is capable of cutting a pair of radii along the arcuate path 108 and 110, respectively.

Figure 6:
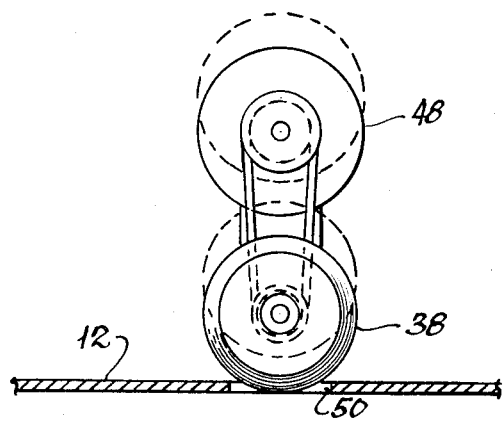
FIG. 6 is a detailed view of the operation of slitting knives which can be employed in the practice of the invention.
Figure 7:
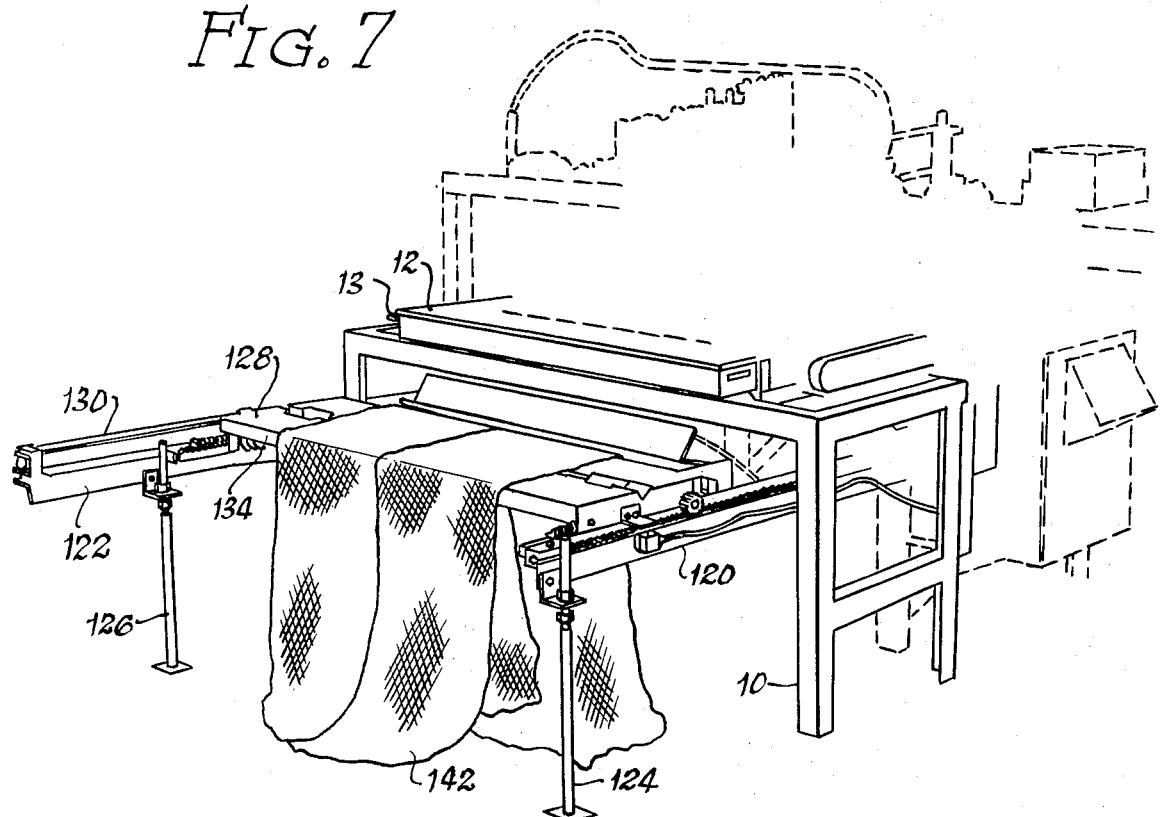
FIG. 7 is a perspective view of a stacker assembly for use with the cutting machine of the invention.
Figure 8:
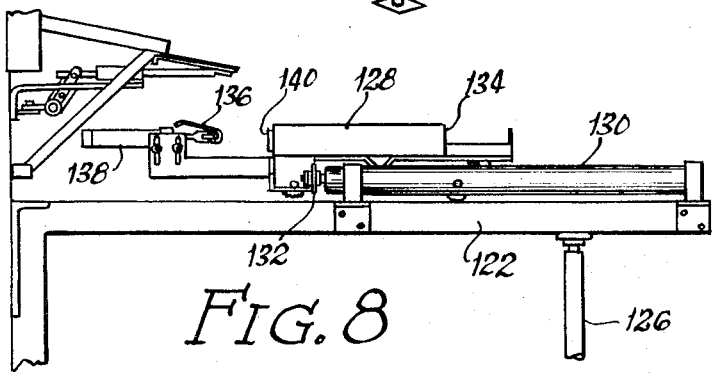
FIG. 8 is a side elevation view of the stacker assembly shown in FIG. 7.
Figure 9:
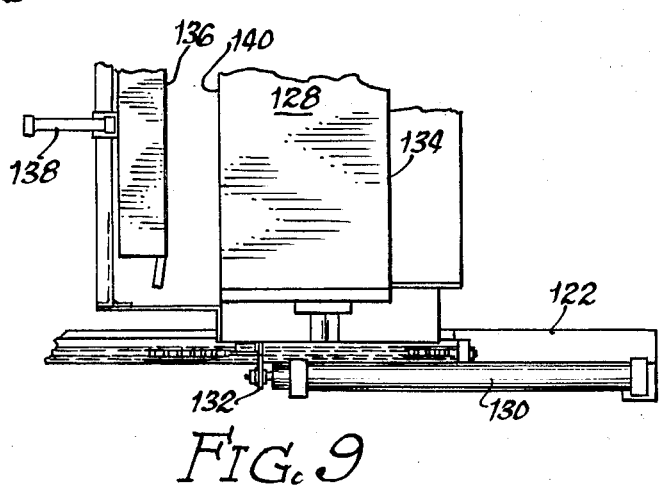
FIG. 9 is a plan view of the stacker assembly shown in FIGS. 7 and 8.

Positioned to the rear of the transverse cutter 22' are one or more trimming knives 38 of the type shown in FIGS. 4 and 6. Any number of such trimming knives can be employed, depending upon the configuration of the pattern sought to be cut.

If desired, the apparatus of the present invention can also include additional radius cutting assemblies 112 and 114 positioned above the cutting surface 12'. In the embodiment shown in FIG. 5 of the drawing, the radius cutting assemblies 112 and 114 are positioned adjacent to the lateral edges of the cutting surface 12' and are adapted to travel over the arcuate paths 116 and 118, respectively, a displacement of 90°.

The cutting machine of the present invention is preferably used in combination with stacking means to fold the non-rigid material as it is discharged from the leading edge 13 of cutting surface 12. The details of the stacking assembly preferred for use with the cutting machine of the present invention are shown in FIGS. 5 and 7–9 of the drawing.

The stacking assembly includes a pair of side rails 120 and 122 which are supported by suitable legs 124 and 126, respectively, below the cutting surface 12. Mounted on the side rails 120 and 122 is a movable table 128 which is adapted to be reciprocated in a horizontal plane on rails 120 and 122. It is frequently preferred to reciprocate table 128 by means of a piston and pneumatic or hydraulic cylinder 130 mounted on one of the rails 122, with the piston being operatively connected to the table 128 by means of a bracket 132. Thus, as the piston of cylinder 130 is displaced to the left in FIGS. 8 and 9 of the drawing, the table 128 is displaced rearwardly beneath the cutting surface 12 for a distance sufficient that the material discharged from the leading edge 13 of the cutting surface 12 can be deposited on the leading edge 134 of the table 128.

When the material discharged from the leading edge 13 is deposited on the leading edge 134 of table 128, the direction of travel of the piston in cylinder 130 can be reversed whereby the table is advanced preferably simultaneously with the advancement of material over the cutting surface 12 to deposit the material on the surface of table 128. When the table 128 reaches its most forward position away from the leading edge 13, the direction of travel is again reversed whereby the table is advanced toward the leading edge 13 of cutting surface 12 to fold over the material discharged from the leading edge 13 to form a second layer on the table 128.

It is sometimes desirable to provide means for clamping the material onto table 128. For this purpose, the stacking assembly can be provided with a clamping member 136 which is operatively connected to a fluid operated cylinder 138 to advance the clamping member 136 into pressure engagement with the material on the rear edge 140 of table 128.

As will be appreciated by those skilled in the art, the operation or movement of table 128 relative to the cutting surface 12 can be programmed to form a wide variety of stacking arrangements. For example, the stacking assembly can be programmed to singly drape cut material 142 over the surface of table 128. Alternatively, the stacking assembly is capable of doubly folding the cut material with both ends together and is also capable of providing a "W" fold, depending upon the synchronization of the displacement of the table 128 relative to the material discharged from the leading edge 13 of cutting surface 12.

In the operation of the cutting machine of the present invention, the material to be cut is advanced over the cutting surface 12 by means of the pressure rollers 14 and 16, and the slitting or trimming knives 38 can be displaced downwardly into position to trim the material to the desired width or otherwise longitudinally slit the material advanced over the cutting surface 12. When the desired slits have been made, the advancement of the material over the cutting surface 12 can be stopped and one or more of the radius cutting assemblies can be actuated to cut an arcuate path in the material. Either before or after or with actuation of one or more of the radius cutting assemblies, the transverse cutter 22 can be actuated to cut the material into the desired length.

The operation of the machine of this invention is susceptible to considerable variation depending upon the configuration or pattern to be cut. In actual practice, it is frequently advantageous to provide automatic controls to actuate each of the slit or trimming knives, the transverse cutter and each of the radius cutters in the desired sequence. In this way, the cutting machine of the present invention is capable of being programmed to cut a wide variety of patterns without the necessity of making material alterations in the elements or position of the elements mounted above the cutting surface. For example, when no radius cut is desired, the automatic control system can simply maintain the radius cutters in a deactivated state during advancement of the material over the cutting surface. Such control systems for accomplishing the control of the elements of the cutting machine of this invention are known to those skilled in the art and form no part of the invention.

It will be understood that various changes and modifications can be made in the details of construction, operation and use of the cutting machine of the present invention without departing from the spirit of the invention, especially as defined in the following claims.

I claim:

1. In an apparatus for cutting non-rigid materials having a cutting surface over which a non-rigid material is advanced, the improvement comprising a radius cutter assembly comprising a spindle rotatably mounted above the cutting surface, an arm extending radially outwardly from the spindle and fixed thereto for rotation therewith, said arm including an intermediate portion and a hinged portion, with the intermediate portion being mounted on the hinged portion, a rotary knife mounted on the hinged portion, means for pivoting the hinged portion to raise the rotary knife from a cutting relation with the cutting surface, means for adjusting the height of the intermediate portion from the cutting surface to render the height of the cutting knife above the cutting surface adjustable, means for driving the rotary knife and means for rotating the spindle to advance the rotary knife in an arcuate path over the cutting surface.

2. Apparatus as defined in claim 1 wherein the cutting surface includes a groove therein corresponding to the arcuate path adapted to receive the knife to insure that the knife cuts through the non-rigid material.

3. Apparatus as defined in claim 1 wherein the means for driving the knife is mounted on said arm.

4. Apparatus as defined in claim 1 which includes means for raising the rotary knife from a cutting relation with the cutting surface.

5. Apparatus as defined in claim 1 which includes means for holding the non-rigid material on the cutting surface as the knife is advanced in an arcuate path.

6. Apparatus as defined in claim 1 wherein the means for pivoting the hinged portion includes a fluid operated piston and cylinder.

7. Apparatus as defined in claim 1 wherein the means to rotate the spindle includes a fluid operated piston and cylinder and yoke means operatively connecting the piston with the spindle whereby activation of the piston in one direction advances the rotary knife in an arcuate path in one direction and actuation of the piston in the other direction advances the rotary knife in an arcuate path in the opposite direction.

8. Apparatus as defined in claim 1 wherein the cutting surface includes a plurality of openings therein adapted to pass a fluid under pressure therethrough to minimize friction of the material advanced over the cutter surface and to assist in the removal of scrap from the cutting surface.

9. Apparatus as defined in claim 1 which includes means to stack the material as the material is advanced over the cutting surface.

10. In an apparatus for cutting non-rigid materials including a cutting surface, means for advancing a non-rigid material over the cutting surface, knife means adapted to be displaced transversely over the cutting surface to cut the material into the desired lengths and trimming knife means adapted to slit the material longitudinally as the material is advanced over the cutting surface, the improvement comprising at least one radius cutting assembly comprising a spindle rotatably mounted above the cutting surface, an arm extending radially outwardly from the spindle and fixed thereto for rotation therewith, said arm including an intermediate portion and a hinged portion, with the intermediate portion being mounted on the hinged portion, a rotary knife mounted on the hinged portion, means for pivoting the hinged portion to raise the rotary knife from a cutting relation with the cutting surface, means for adjusting the height of the intermediate portion from the cutting surface to render the height of the cutting knife above the cutting surface adjustable, means for driving the rotary knife and means for rotating the spindle to advance the rotary knife in an arcuate path over the cutting surface.

11. Apparatus as defined in claim 10 wherein the cutting surface includes groove means adapted to receive the knife means and the rotary knife to insure that the knife means and the rotary knife cut through the thickness of the non-rigid material.

12. Apparatus as defined in claim 10 which includes means for raising the rotary knife from a cutting relation with the cutting surface.

13. Apparatus as defined in claim 10 which includes means for holding the non-rigid material on the cutting surface as the knife is advanced in an arcuate path.

14. Apparatus as defined in claim 10 wherein the means for pivoting the hinged portion includes a fluid operated piston and cylinder.

15. Apparatus as defined in claim 10 wherein the means to rotate the spindle includes a fluid operated piston and cylinder and yoke means operatively connecting the piston with the spindle whereby activation of the piston in one direction advances the rotary knife in an arcuate path in one direction and actuation of the piston in the other direction advances the rotary knife in an arcuate path in the opposite direction.

16. Apparatus as defined in claim 10 wherein the cutting surface includes a plurality of openings therein adapted to pass a fluid under pressure therethrough to minimize friction of the material advanced over the cutter surface and to assist in the removal of scrap from the cutting surface.

17. Apparatus as defined in claim 10 wherein the trimming knife means includes at least one rotary trimming knife, said rotary trimming knife being mounted above the cutting surface and operatively connected to a fluid operated piston and cylinder whereby the rotary trimming knife is adapted to be lowered into cutting engagement with the material on the cutting surface and raised therefrom.

18. Apparatus as defined in claim 17 wherein the trimming knife means includes means to drive the rotary trimming knife.

19. Apparatus as defined in claim 17 wherein the cylinder is movably mounted above the cutting surface.

20. Apparatus as defined in claim 10 which includes stacking means for receiving the material advanced over the cutting surface.

21. Apparatus as defined in claim 20 wherein the stacking means includes a table adapted to be reciprocated in a horizontal plane, said table being positioned below the cutting surface to receive the material passed over the cutting surface, and means to reciprocate the table as material is advanced over the cutting surface to stack the material on the table.

22. Apparatus as defined in claim 21 wherein the means for reciprocating the table includes a fluid operated piston and cylinder.

* * * * *